(12) United States Patent
Thomas

(10) Patent No.: US 7,571,933 B2
(45) Date of Patent: Aug. 11, 2009

(54) AIR BAG CUSHION FOLD AND METHOD THEREOF

(75) Inventor: Scott David Thomas, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 343 days.

(21) Appl. No.: 11/053,740

(22) Filed: Feb. 8, 2005

(65) Prior Publication Data
US 2006/0175818 A1 Aug. 10, 2006

(51) Int. Cl.
B60R 21/16 (2006.01)
B60R 21/237 (2006.01)

(52) U.S. Cl. .................................................. 280/743.1
(58) Field of Classification Search ............... 280/743.1
See application file for complete search history.

(56) References Cited

U.S. PATENT DOCUMENTS

| | | | | |
|---|---|---|---|---|
| 4,903,986 A | | 2/1990 | Cok et al. ................... 280/743 |
| 5,140,799 A | * | 8/1992 | Satoh .......................... 53/429 |
| 5,162,035 A | * | 11/1992 | Baker .......................... 493/405 |
| 5,275,435 A | | 1/1994 | Fischer .................... 280/743 R |
| 5,351,977 A | | 10/1994 | Grace .......................... 280/738 |
| 5,360,387 A | * | 11/1994 | Baker .......................... 493/405 |
| 5,364,126 A | | 11/1994 | Kuretake et al. ............ 280/730 |
| 5,425,551 A | | 6/1995 | Hawthorn ................ 280/743.1 |
| 5,531,476 A | | 7/1996 | Kerner .................... 280/743.1 |
| 5,605,350 A | * | 2/1997 | Bates et al. ............. 280/743.1 |
| 5,636,860 A | | 6/1997 | Fischer et al. ........... 280/730.1 |
| 5,681,052 A | | 10/1997 | Ricks et al. .............. 280/743.1 |
| 6,050,596 A | * | 4/2000 | Boerger ...................... 280/729 |
| 6,170,857 B1 | * | 1/2001 | Okada et al. ............. 280/728.1 |
| 6,176,509 B1 | * | 1/2001 | Kawaguchi et al. ...... 280/728.1 |
| 6,179,322 B1 | | 1/2001 | Faigle et al. ............. 280/728.2 |
| 6,186,544 B1 | | 2/2001 | Igawa ...................... 280/743.1 |
| 6,264,237 B1 | | 7/2001 | Terada .................... 280/743.1 |
| 6,299,202 B1 | * | 10/2001 | Okada et al. ................. 280/732 |
| 6,352,284 B1 | * | 3/2002 | Okada et al. ............. 280/743.1 |
| 6,499,765 B2 | | 12/2002 | Hawthorn et al. ........ 280/743.1 |
| 6,607,209 B2 | * | 8/2003 | Dannenhauer et al. ... 280/728.2 |
| 6,702,318 B2 | * | 3/2004 | Rose et al. ............... 280/728.2 |
| 6,746,045 B2 | | 6/2004 | Short et al. ................. 280/736 |
| 6,802,528 B2 | | 10/2004 | Short et al. ............... 280/728.3 |
| 6,918,868 B2 | * | 7/2005 | Vitet .......................... 493/457 |
| 2002/0093183 A1 | | 7/2002 | Ishikawa et al. ......... 280/743.1 |
| 2002/0185848 A1 | | 12/2002 | Mu et al. ..................... 280/740 |

* cited by examiner

Primary Examiner—John Q. Nguyen
Assistant Examiner—Joselynn Y. Sliteris

(57) ABSTRACT

A supplemental inflatable restraint system comprises an inflation fluid dispensing member in fluid communication with an inflatable cushion. The cushion includes a contact face, and folds that at least partially define a substantially unobstructed fluid path between the inflation fluid dispensing member and the contact face. At least some of the folds are tucked between the contact face and the inflation fluid dispensing member. Upon actuation of the inflation fluid dispensing member, fluid travels through the fluid path to inflate the cushion outward such that the cushion is presented as a single layer at the contact face throughout inflation. A method of folding an inflatable cushion for use in a supplemental inflatable restraint system includes the steps of providing a substantially flat inflatable cushion, providing an inflation fluid dispensing member, folding the cushion to create folds, and tucking at least some of the folds into the cushion such that a substantially unobstructed fluid path extends between the inflation fluid dispensing member and the contact face.

17 Claims, 5 Drawing Sheets

AIR BAG CUSHION FOLD AND METHOD THEREOF

TECHNICAL FIELD

The present invention relates to an inflatable cushion for use in a supplemental inflatable restraint system of a vehicle and, more particularly, to an inflatable cushion folded to create an unobstructed fluid path between an inflation fluid dispensing member and a contact face of the cushion.

BACKGROUND OF THE INVENTION

An inflatable cushion is typically folded and supported within a dashboard, a seat, a door, a headliner, or a steering wheel of a vehicle interior compartment. Commonly, the cushion has a number of folds to create a cushion pack, such that the cushion pack fits within a support member. When the cushion is inflated, high pressure gas is directed therein, thereby causing the cushion to unfold and inflate. The packing arrangement of the cushion within a support member largely determines how the cushion pack will unfold and inflate.

SUMMARY OF THE INVENTION

The present invention provides a supplemental inflatable restraint system including an inflation fluid dispensing member in fluid communication with an inflatable cushion. The cushion includes a contact face, and folds that at least partially define a substantially unobstructed fluid path between the inflation fluid dispensing member and the contact face. At least some of the folds are tucked between the contact face and the inflation fluid dispensing member. Upon actuation of the inflation fluid dispensing member, fluid travels through the fluid path to inflate the cushion outward such that the cushion is presented as a single layer at the contact face throughout inflation. Preferably, the folds include first, second, third and fourth sets of folds. The first, second, third and fourth sets of folds may be provided by any folding method known in the art, including but not limited to accordion folding, pleat folding, or roll folding. A combination of folding techniques may be employed within one of the sets; for instance, the first and/or second sets of folds may be created by pleat folding with one accordion fold tucked into the pleats.

Preferably, the first set of folds is created by folding the cushion inward from a first direction, while the second set of folds is created by folding the cushion inward from a second direction, with the second direction preferably substantially opposing the first direction. Similarly, the third set of folds is preferably created by folding the cushion inward from a third direction preferably substantially offset from the first and second directions, while the fourth set of folds is created by folding the cushion inward from a fourth direction preferably substantially opposing the third direction. Preferably, the third and fourth directions are substantially perpendicular to the first and second directions.

The cushion may include an outer surface, with first and third portions of the outer surface disposed directly adjacent a second portion of the outer surface. In this case, at least one of the third and fourth sets of folds is tucked between the first and third portions, respectively, and one of the contact face and the inflation fluid dispensing member. The second portion may be the contact face.

The supplemental inflatable restraint system may further include a support member supporting the cushion within a vehicle, and a cover engaging the support member to define a cavity for housing the cushion. The cover may be a driver air bag cover in a vehicle steering wheel, or may be disposed in an instrument panel or in any other interior vehicle structure.

The present invention also provides a method of folding an inflatable cushion for use in a supplemental inflatable restraint system. An inflatable cushion and an inflation fluid dispensing member are provided. The cushion is folded, and the inflation fluid dispensing member is installed within the cushion as known in the art. As a result of the folding, a substantially unobstructed fluid path extends between the inflation fluid dispensing member and a contact face of the cushion, thereby allowing the cushion to be presented as a single layer at the contact face upon actuation of the inflation fluid dispensing member. During folding, the cushion is lifted away from the inflation fluid dispensing member at either the contact face or a mounting ring installed through the cushion opposite the contact face, and at least some of the folds are preferably tucked between the contact face and the inflation fluid dispensing member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
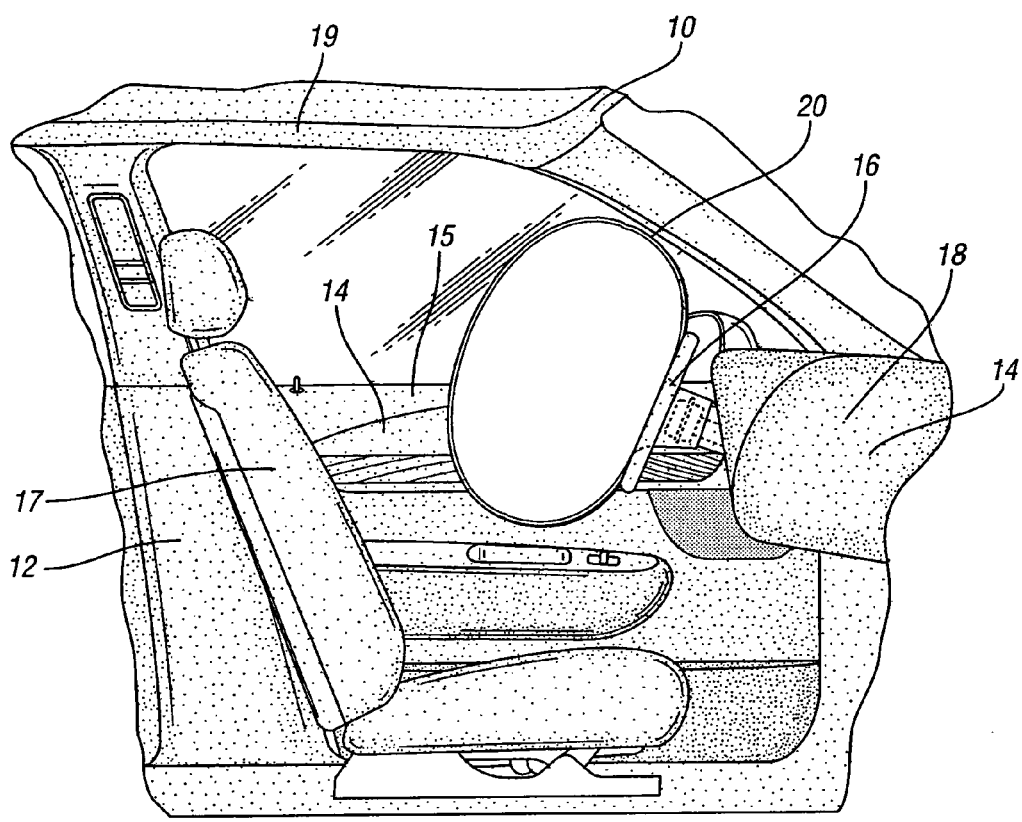
FIG. 1 is a schematic side view of a vehicle having a supplemental inflatable restraint system according to the present invention.

Referring to the Figures, wherein like reference numerals refer to like components, FIG. 1 shows a vehicle 10 including an interior compartment 12 and vehicle interior structure (generally shown at 14). The vehicle interior structure 14 includes any portion of the interior compartment 12 where a supplemental inflatable restraint may be mounted, such as within a steering wheel 16, an instrument panel 18, a door 15, a seat 17, or a headliner 19. By way of example, an inflatable cushion 20 is shown extending from the steering wheel 16 in an inflated condition. The cushion 20 could be positioned within any portion of the vehicle interior structure 14 without changing the inventive concept.

Figure 2:
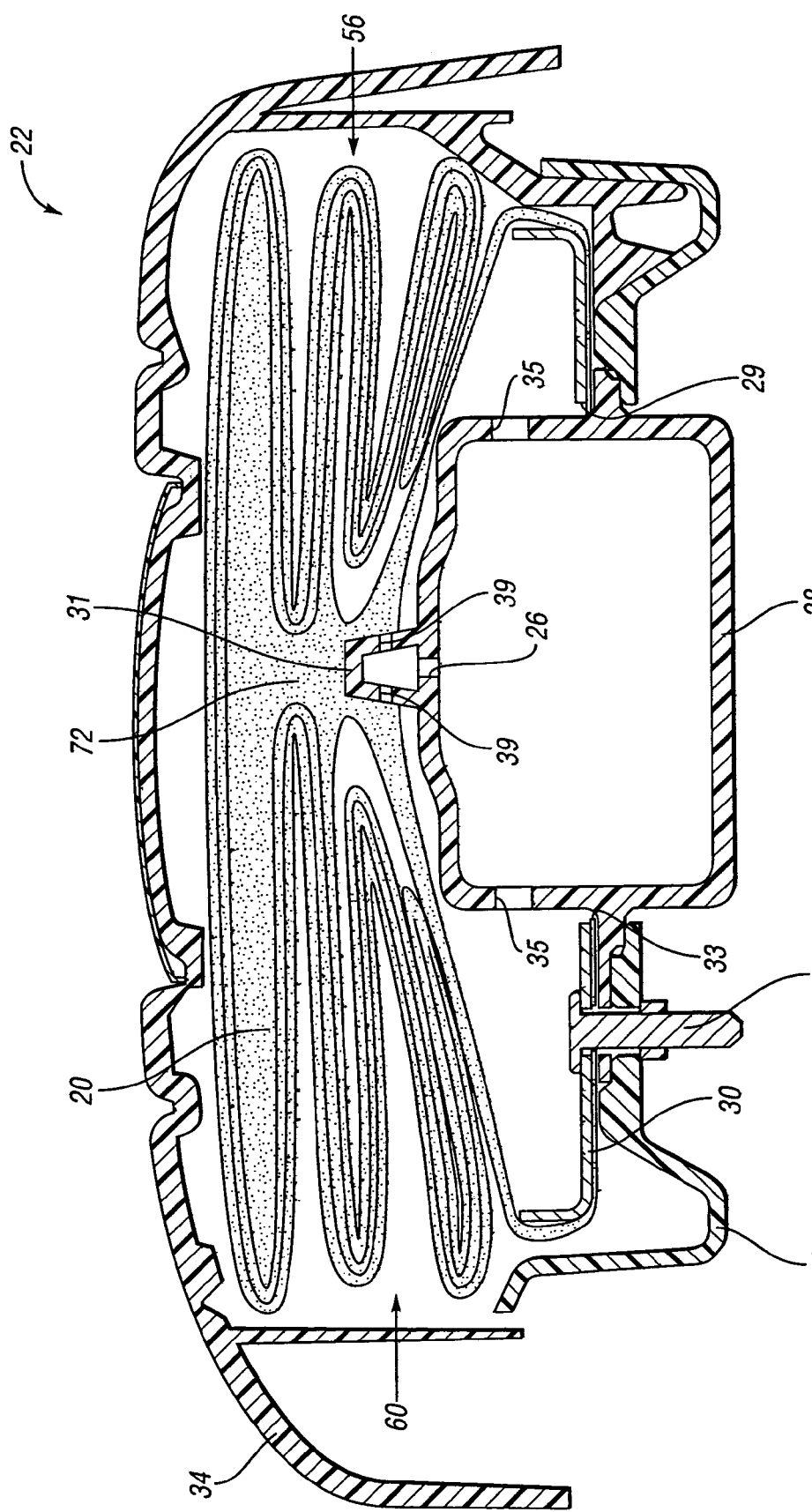
FIG. 2 is a schematic partially cross-sectional view of the restraint system of FIG. 1 incorporated within a steering wheel.

FIG. 2 shows a supplemental inflatable restraint system 22 according to the present invention. A support member 24 supports the cushion 20 within the vehicle 10. FIG. 2 shows a restraint system 22 adapted to be mounted within a steering wheel 16 (such as steering wheel 16 of FIG. 1), such that the support member 24 is a base plate. A mounting ring 30 defines an opening at 29, while the cushion 20 defines an opening at 33. An inflation fluid dispensing member 28 extends through the openings 29, 33, such that the inflation fluid dispensing member 28 is in fluid communication with the cushion 20. As shown in FIG. 2, the inflation fluid dispensing member 28 is an inflator, and may be referred to as such herein. However, the inflation fluid dispensing member could also be a fill tube extending through the openings 29, 33 and connecting to a remote inflator, as will be understood by those skilled in the art, without changing the inventive concept.

In the preferred embodiment, the inflator 28 is selectively actuatable to provide a fluid, preferably a pressurized gas such as nitrogen, argon, or carbon dioxide, for deploying the cushion 20 outward into the interior compartment 12 of FIG. 1. A plurality of openings 35 are spaced about a circumferential perimeter of the inflator 28 for providing the fluid. The inflator 28 includes a nozzle 31 extending up into the cushion 20 between sets of folds described below, with openings 39 in the nozzle 31 delivering fluid into the cushion 20. The nozzle 31 may be in fluid communication with the inflator 28 via an opening 26 therebetween, as shown in FIG. 2, or the nozzle 31 may be integral with the inflator 28, such that the nozzle 31 is essentially an extension of a wall of the inflator 28. While FIG. 2 shows openings 39 spaced about a circumferential perimeter of the nozzle 31, the openings 39 may be placed through any portion of the nozzle 31 without changing the inventive concept.

For ease of explanation, the inflator 28 is shown in FIGS. 5a-12 during various stages of cushion folding. The inflator 28 is preferably installed only after folding of the cushion 20. Additionally, the inflator 28 preferably extends up into the cushion 20 as shown in FIG. 2. The schematic depiction of the inflator 28 in other drawings shows only the general position of the inflator 28 with respect to the cushion 20 following installation, and should be taken as such.

Referring again to FIG. 2, preferably a plurality of fasteners, one of which is shown at 32, extend through the cushion 20, the mounting ring 30, and the support member 24 to retain the cushion 20 at the support member 24. However, the cushion 20 may be retained at the support member 24 in any conventional manner. For example, the cushion 20 may wrap around the inflator 28. A cover 34 engages the support member 24 to define a cavity for housing the cushion 20. Since FIG. 2 shows a restraint system 22 for use within a steering wheel 16 (i.e., a driver's side restraint system), the support member 24 defines a bottom of the cavity, while the cover 34 includes side walls to define the other three sides thereof. If a restraint system were used within another portion of the vehicle interior structure 14 shown in FIG. 1, a support member may define the bottom and sides of the cavity, with a cover defining a top thereof. A restraint system may be used within any portion of the vehicle interior structure 14 without changing the inventive concept (i.e., it may be a passenger or side impact restraint system, with a cushion mounted in a different manner to surrounding vehicle interior structure 14).

Figures 3A, 3B:
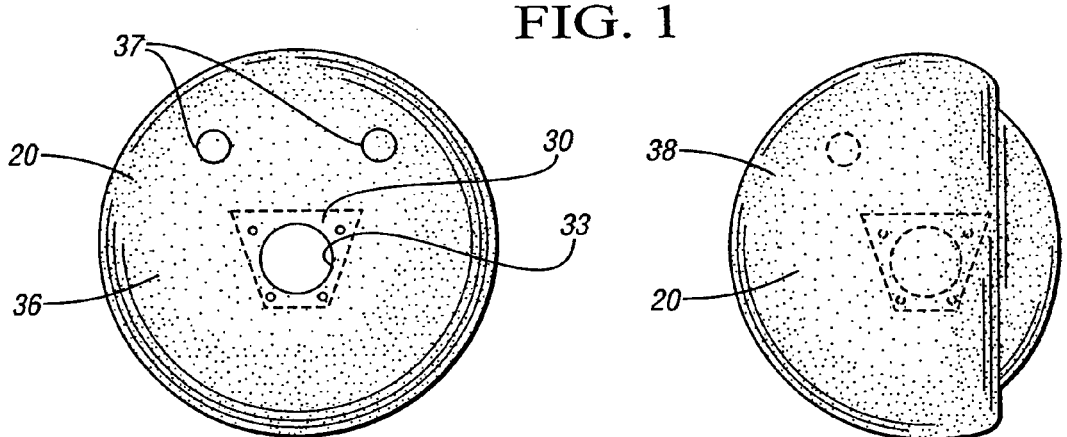
FIG. 3a is a schematic plan view of a forward face of an inflatable cushion for use within the restraint system of FIG. 2.
FIG. 3b is a schematic plan view of a rearward contact face of the cushion of FIG. 3a after a first pleat has been provided during formation of a first set of folds therein.
Figure 3C:
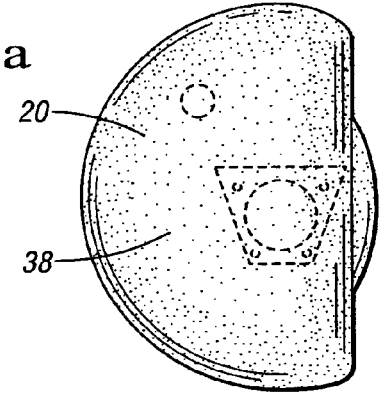
FIG. 3c is a schematic plan view of the contact face of the cushion of FIG. 3b after a second pleat has been provided during formation of the first set of folds therein.

As shown in FIGS. 3a-3c, the cushion 20 includes a forward face 36 and a rearward contact face 38, with "forward" and "rearward" referring to the position of the cushion 20 after mounting within the vehicle 10. The forward face 36 preferably includes at least one vent 37 for controlling inflation of the cushion 20, as known in the art. The forward face 36 also defines the opening 33 through which the inflator 28 extends following inflator installation, as shown in FIG. 2. Preferably, the cushion 20 initially rests in a substantially flat, uninflated condition, with the forward and contact faces 36, 38 adjacent one another. The cushion 20 must be folded to fit within the cavity defined by the support member 24 and the cover 34 of FIG. 2.

Figure 3D:
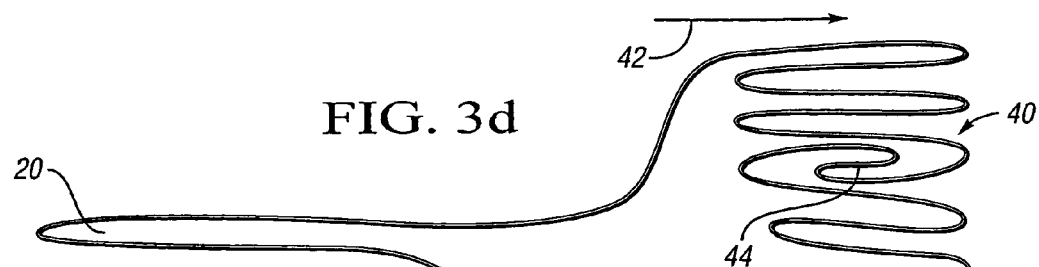
FIG. 3d is a schematic cross-sectional view of the cushion of FIG. 3c after providing the first set of folds therein by pleating and including an accordion fold.

Referring to FIG. 3d, preferably the cushion 20 is initially provided with a first set of folds 40 by folding the cushion 20 inward from a first direction 42 in any manner known in the art. By way of example, FIGS. 3b and 3c show the cushion 20 in various stages of pleat folding. FIG. 3d shows a cross-sectional view of the cushion 20 and the mounting ring 30 following formation of the first set of folds 40 by pleat folding. A first overhang portion 44 has been accordion-folded into the first set of folds 40.

Figure 4A:
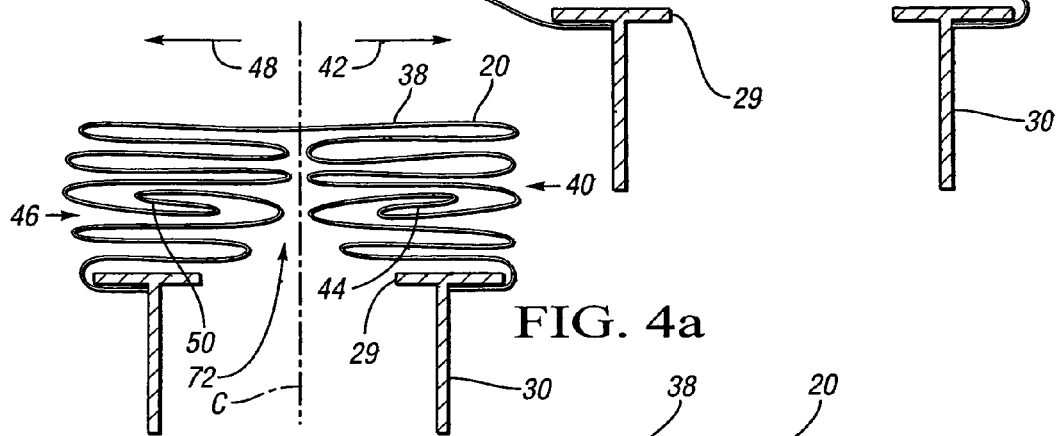
FIG. 4a is a schematic cross-sectional view of the cushion of FIG. 3d after providing the first set of folds and a second set of folds therein.

A second set of folds 46 is then provided by folding the cushion 20 inward from a second direction 48, with the second direction 48 preferably opposing the first direction 42. FIG. 4a shows a cross-sectional view of the cushion 20 and the mounting ring 30 following formation of the second set of folds 46 by pleat folding. A second overhang portion 50 has been accordion-folded into the second set of folds 46. Although the first and second sets of folds 40, 46 are identical as shown in FIG. 4a, it should be noted that the first set of folds 40 may differ considerably from the second set of folds 46 without changing the inventive concept. For example, the first set of folds 40 may be primarily provided through accordion folding, with the second set of folds 46 primarily provided through pleat folding.

Figure 4B:
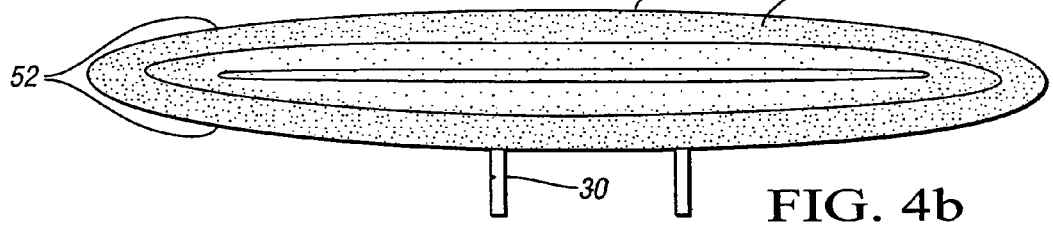
FIG. 4b is a schematic side view of the cushion of FIG. 3d after providing the first and second sets of folds therein.

As shown in FIG. 4a, in the preferred embodiment, the first set of folds 40 is disposed on one side of a centerline C, while the second set of folds 46 is disposed on the opposite side of the centerline C. While it is important that the first and second sets of folds 40, 46 do not substantially overlap one another, they need not be equidistant from the centerline C as shown in FIG. 4a. To practice the present invention, there need only be a substantially unobstructed path between the inflator 28 and an outermost layer of the cushion 20 (i.e. the contact face 38 of the cushion 20), as shown in FIG. 4a, following the first and second sets of folds 40, 46. FIG. 4b shows a side view of the cushion 20 and mounting ring 30 following formation of the first and second sets of folds 40, 46 (i.e., a side view of the cushion 20 of FIG. 4a). The cushion 20 defines an outer surface 52. Preferably, formation of the first and second sets of folds 40, 46 decreases the cushion width, shown best in FIG. 4a, such that it is approximately the same (or less than) the width of the cavity defined by the inside of the support member 24 and the cover 34.

Figure 5A:
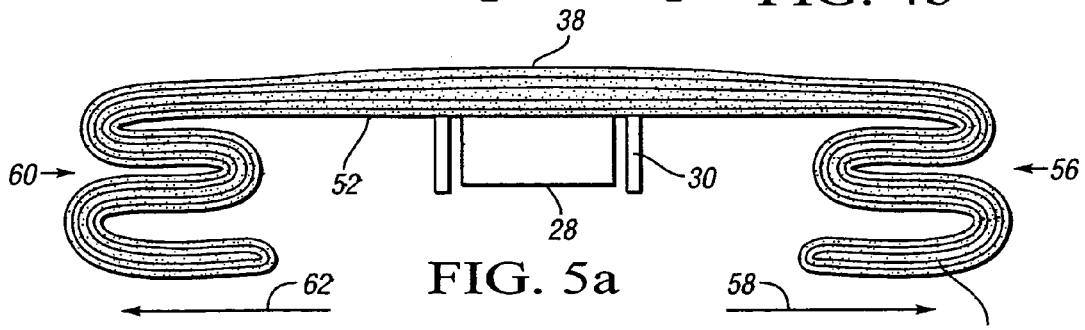
FIG. 5a is a schematic side view of the cushion of FIG. 4b after providing third and fourth sets of folds therein through accordion folding.
Figure 5B:
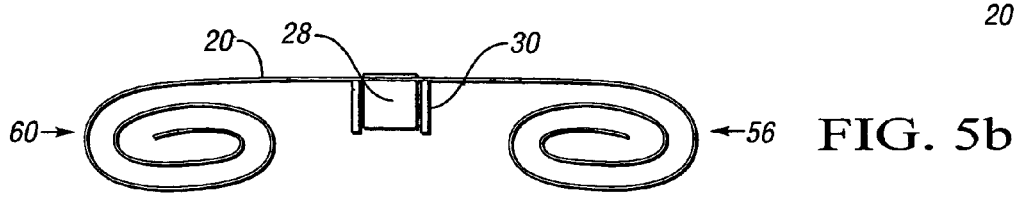
FIG. 5b is a schematic side view of the cushion of FIG. 4b after providing third and fourth sets of folds therein through roll folding.
Figure 5C:
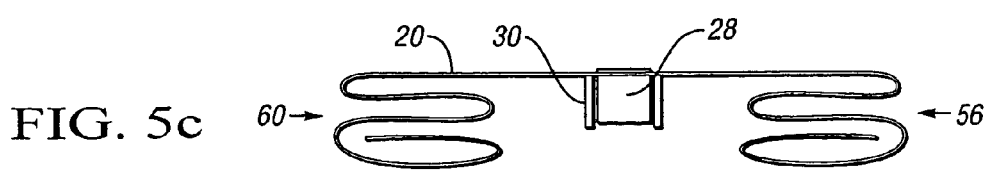
FIG. 5c is a schematic side view of the cushion of FIG. 4b after providing third and fourth sets of folds therein through a combination of accordion folding and roll folding.

Turning to FIGS. 5a-5c, third and fourth sets of folds 56, 60 are next provided. Specifically, the third set of folds 56 is provided by folding the cushion 20 inward from a third direction 58, with the third direction 58 preferably being substantially perpendicular to the first and second directions 42, 48. The fourth set of folds 60 is then provided by folding the cushion 20 inward from a fourth direction 62, with the fourth direction 62 substantially opposing the third direction 58. The third and fourth sets of folds 56, 60 may be provided by accordion folding, as in FIG. 5a, roll folding, as in FIG. 5b, or a combination of accordion folding and roll folding, as in FIG. 5c. Note that FIGS. 5b and 5c are strictly schematic representations of the third and fourth sets of folds that would result from alternate folding methods. As such, FIGS. 5b and 5c neither distinctly identify particular folds, nor show any depth to the cushion. Additionally, any other type of folding known in the art may be used, such as pleat folding. While the third and fourth sets of folds 56, 60 are identical as shown in FIGS. 5a-5c, it should be noted that the third set of folds 56 may differ considerably from the fourth set of folds 60 without changing the inventive concept. For example, the third set of folds 56 may be primarily provided by accordion folding, with the fourth set of folds 60 primarily provided through roll folding.

Figure 6:
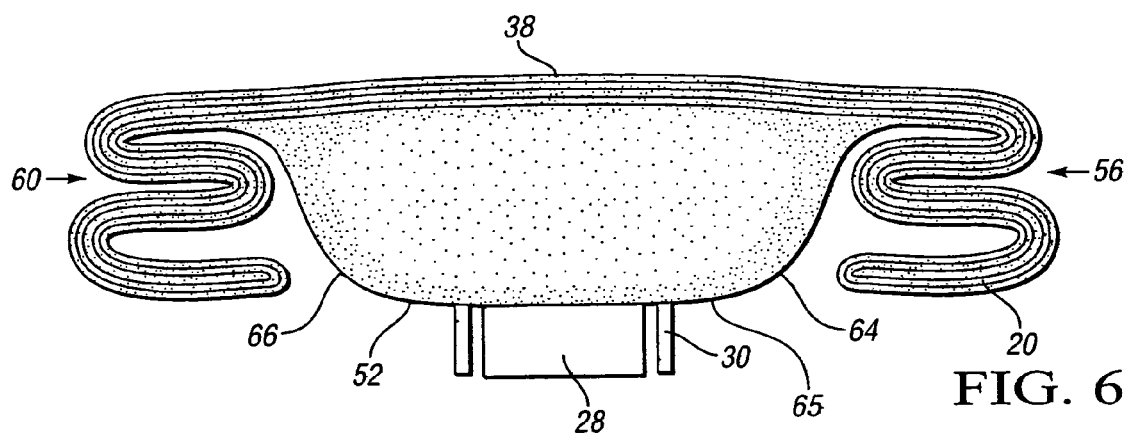
FIG. 6 is a schematic side view of the cushion of FIG. 5c after lifting a contact face away from an inflation fluid dispensing member.
Figure 7:
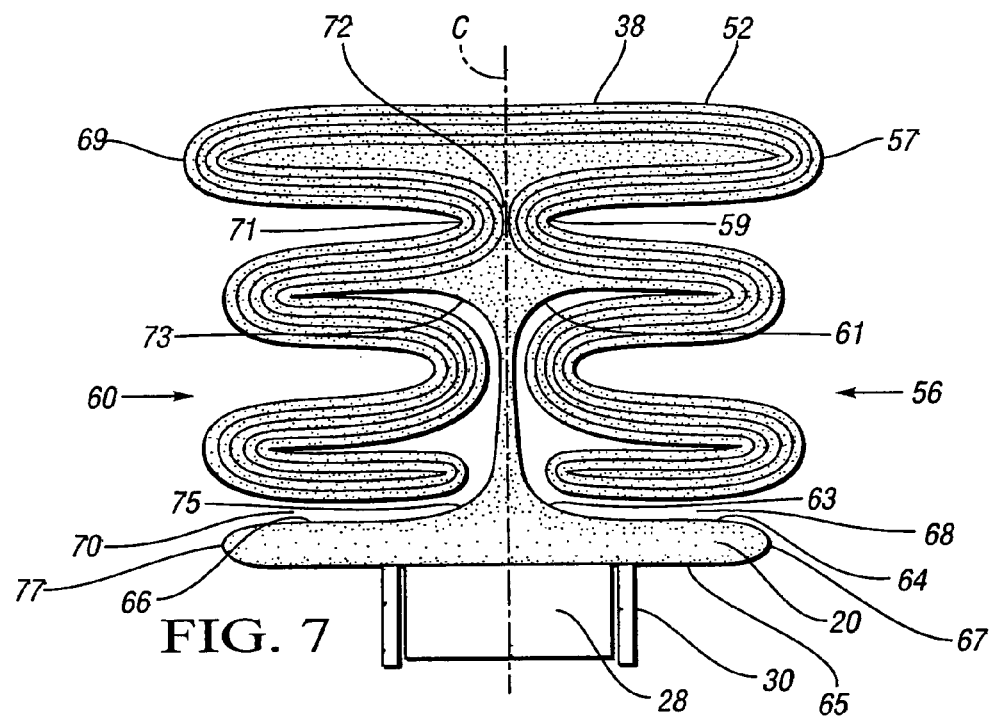
FIG. 7 is a schematic side view of the cushion of FIG. 6 after tucking the third and fourth sets of folds between the contact face and the inflation fluid dispensing member.

Following formation of the third and fourth sets of folds 56, 60, some of the cushion 20 is lifted away from the contact face 38, preferably at the mounting ring 30, as shown in FIG. 6. Lifting the cushion 20 reveals a first portion 64 and a third portion 66 of the outer surface 52 of the cushion 20. A second portion 65 of the outer surface 52 extends between the first and third portions 64, 66. The third and fourth sets of folds 56, 60 are then tucked between the first and third portions 64, 66 and the contact face 38 as shown in FIG. 7, moving the first and third portions 64, 66 directly adjacent the second portion 65. Specifically, the third set of folds 56 is tucked between the first portion 64 and the contact face 38, while the fourth set of folds 60 is tucked between the third portion 66 and the contact face 38. While in the preferred embodiment both of the third and fourth sets of folds 56, 60 are tucked within the cushion 20, only one of the third and fourth sets of folds 56, 60 need be tucked to practice the present invention. That is, the third set of folds 56 may be tucked between the first potion 64 and the contact face 38, with the fourth set of folds 60 created by roll folding without a tuck, without comprising the inventive concept.

Additional folds 57, 59, 61, 63, 67 are created while tucking the third set of folds 56, while additional folds 69, 71, 73, 75, 77 are created while tucking the fourth set of folds 60. Additional folds 67, 77 are between the first and third portions 64, 66, respectively, and the second portion 65, such that additional folds 67, 77 allow the first and third portions 64, 66 to lie adjacent the second portion 65. It can thus be seen that the first portion 64 of the outer surface 52 can be defined as the portion of the cushion 20 between additional fold 67 and additional fold 63, while the third portion 66 of the outer surface 52 can be defined as the portion of the cushion 20 between additional fold 77 and additional fold 75. While shown substantially horizontal in FIG. 7, the first and third portions 64, 66 need not be horizontal to practice the present invention. Additionally, it can be seen from FIG. 7 that tucking the third and fourth sets of folds 56, 60 between the first and third portions 64, 66 and the contact face 38 creates first and second pockets 68, 70, with the third and fourth sets of folds 56, 60 resting within the first and second pockets 68, 70. Additional folds 61, 63 partially define the first pocket 68, while additional folds 73, 75 partially define the second pocket 70. The third and fourth sets of folds 56, 60 further reduce the size of the cushion 20 such that the cushion 20 fits within the cavity formed by the support member 24 and the cover 34 of FIG. 2. Accordingly, as used herein, the cushion 20 is "tucked" when additional folds are created, and a portion of the cushion 20 is moved between or within those additional folds.

As shown in FIG. 7, in the preferred embodiment, the third set of folds 56 is disposed on one side of the centerline C, while the fourth set of folds 60 is disposed on the opposite side of centerline C. While it is important that the third and fourth sets of folds 56, 60 do not substantially overlap one another, they need not be equidistant from the centerline C as shown in FIG. 7. To practice the present invention, there need only be a substantially unobstructed path between the inflator 28 and an outermost layer of the cushion 20 (i.e., the contact face 38), as shown in FIG. 7, following the third and fourth sets of folds 56, 60.

Since the first and second sets of folds 40, 46 do not substantially overlap, and since the third and fourth sets of folds 56, 60 do not substantially overlap, the first, second, third, and fourth sets of folds 40, 46, 56, 60 at least partially define a substantially unobstructed fluid path 72 between the inflator 28 and the contact face 38 ("contact face" 38 refers to the inside and the outside surfaces of the airbag at the contact area). It is possible that some or all of the first, second, third and fourth sets of folds 40, 46, 56, 60 may slightly overlap one another as the folded cushion 20 is compressed during installation within the cavity; however the fluid path 72 remains substantially unobstructed. Though not readily visible in FIG. 7, which shows a side view of the cushion 20 following folding, the contact face 38 covering the fluid path 72 is a single layer of cushion material following folding as described above. Additionally, the nozzle 31 shown in FIG. 2 preferably extends upward into the cushion 20 into the fluid path 72 between the sets of folds 40, 46, 56, 60 and helps to direct inflation fluid to the fluid path 72.

Upon actuation of the inflator 28, fluid emitted therefrom travels through the fluid path 72 to inflate the cushion 20. Since the fluid path 72 is substantially unobstructed between the inflator 28 and the contact face 38, the cushion 20 deploys outward toward a vehicle occupant in a single layer at the contact face 38, preferably along centerline C. Inflation of the sets of folds 40, 46, 56, 60 preferably occurs radially outward, instead of deploying directly outward along centerline C. By reducing the amount of cushion material deploying directly outward by providing the sets of folds 40, 46, 56, 60 surrounding the fluid path 72 which easily open radially outward, and specifically by presenting the cushion in a single layer at the contact face 38, the present invention may reduce the impact force in the direction of the centerline C.

Figure 8:
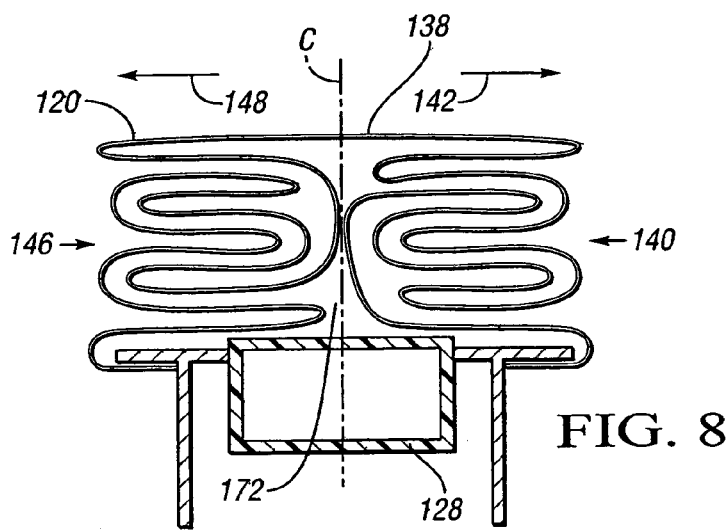
FIG. 8 is a schematic cross-sectional view of a second embodiment of a cushion for use within the restraint system after providing first and second sets of folds therein.
Figure 9A:
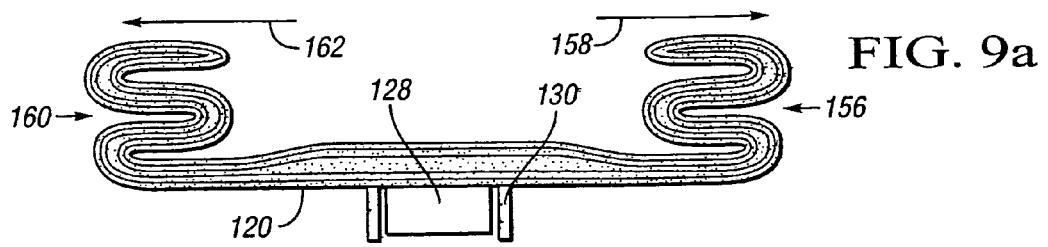
FIG. 9a is a schematic side view of the cushion of FIG. 8 after providing third and fourth sets of folds therein through accordion folding.
Figure 9B:
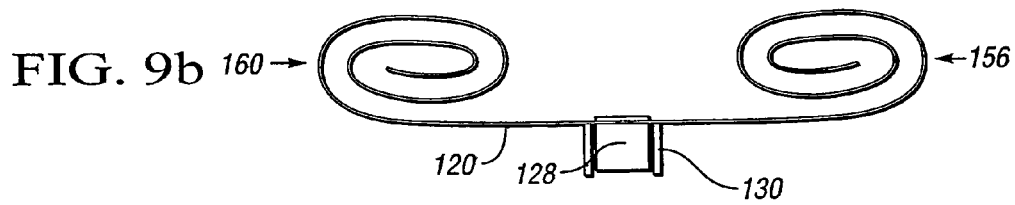
FIG. 9b is a schematic side view of the cushion of FIG. 8 after providing third and fourth sets of folds therein through roll folding.
Figure 9C:
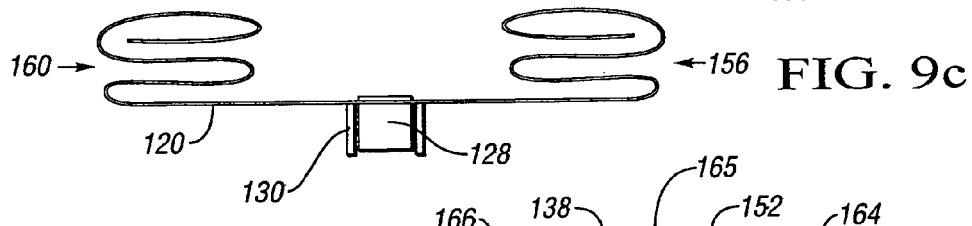
FIG. 9c is a schematic side view of the cushion of FIG. 8 after providing third and fourth sets of folds therein through a combination of accordion folding and roll folding.

FIGS. 8-11 show a second embodiment of the present invention. FIG. 8 shows a cushion 120 following creation of first and second sets of folds 140, 146 by folding the cushion 120 inward from first and second directions 142, 148, respectively. The first and second sets of folds 140, 146 have been provided by accordion folding, and then by tucking the accordion folds within a pleat as known in the art, to bring the cushion to a width approximately the same or less than the width of the cavity defined by the support member 24 and the cover 34 of FIG. 2. Note that the first set of folds 140 differ from the second set of folds 146, which is within the scope of the present invention. Turning to FIGS. 9a-9c, third and fourth sets of folds 156, 160 are then provided by folding the cushion 120 inward from third and fourth directions 158, 152, respectively. The third and fourth sets of folds 156, 160 may be provided by accordion folding, as shown in FIG. 9a, roll folding, as shown in FIG. 9b, or a combination of accordion folding and roll folding, as in FIG. 9c. As with FIGS. 5b and 5c, note that FIGS. 9b and 9c are strictly schematic representations of the third and fourth sets of folds that would result from alternate folding methods. As such, FIGS. 9b and 9c neither distinctly identify particular folds, nor show any depth to the cushion. It should also be noted that any other type of folding known in the art may be used.

Figure 10:
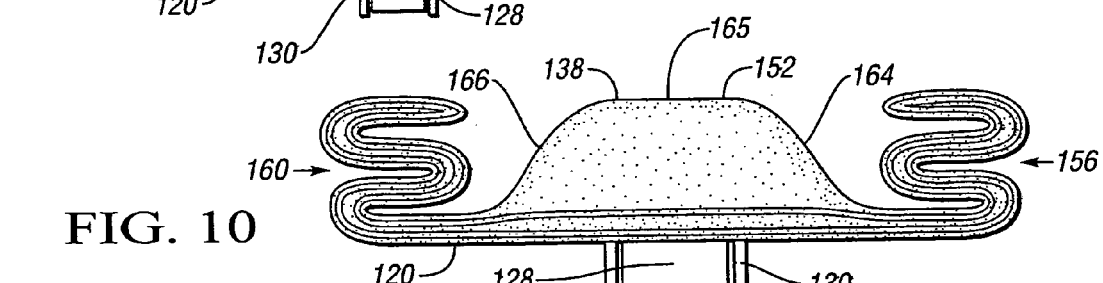
FIG. 10 is a schematic side view of the cushion of FIG. 9a after lifting a contact face away from an inflation fluid dispensing member.
Figure 11:
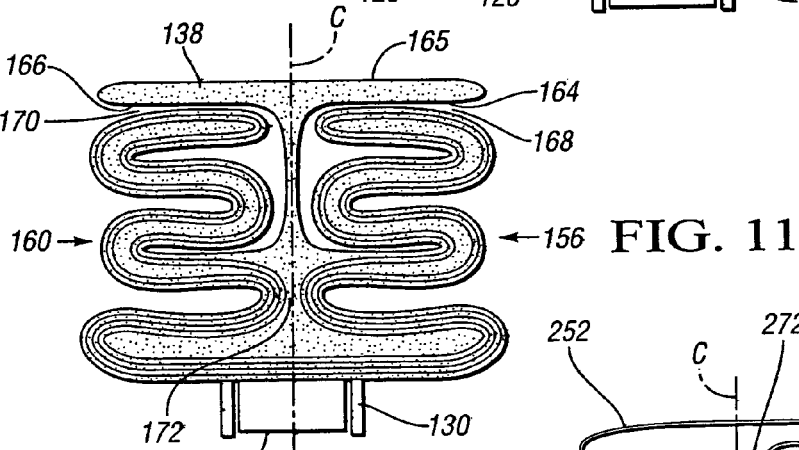
FIG. 11 is a schematic side view of the cushion of FIG. 10 after tucking the third and fourth sets of folds between a contact face and an inflation fluid dispensing member.

Following formation of the third and fourth sets of folds 156, 160, the cushion 120 is lifted away from a mounting ring 130 and an inflator 128, preferably at a contact face 138, to reveal a first portion 164 and a third portion 166 of an outer surface 152 of the cushion 120, as shown in FIG. 10. A second portion 165 of the outer surface 152 interconnects the first and third portions 164, 166. In this embodiment, the second portion 165 is a portion of the contact face 138. The third and fourth sets of folds 156, 160 are then tucked between the first and third portions 164, 166 and the inflator 128 as shown in FIG. 11. Specifically, the third set of folds 156 is tucked between the first portion 164 and the inflator 128, while the fourth set of folds 160 is tucked between the third portion 166 and the inflator 128. It can be seen from FIG. 11 that tucking the third and fourth sets of folds 156, 160 between the first and third portions 165, 166, respectively, and the inflator 128 creates first and second pockets 168, 170, with the third and fourth sets of folds 156, 160 resting within the respective first and second pockets 168, 170. The third and fourth sets of folds 156, 160 reduce the size of the cushion 120 such that the cushion 120 fits within the cavity formed by the support member 24 and the cover 34 of FIG. 2, while creating a substantially unobstructed fluid path 172 between the inflator 128 and the contact face 138.

Figure 12:
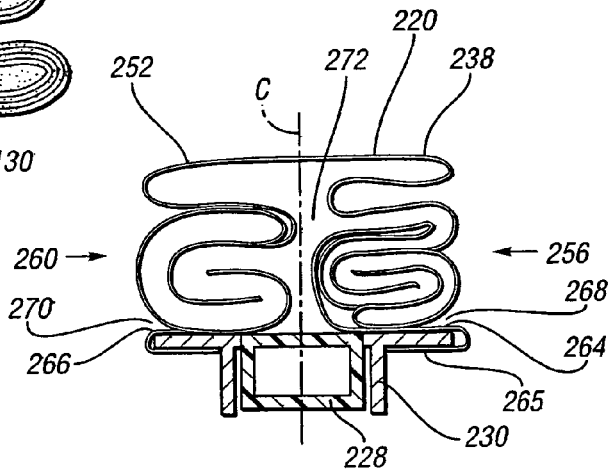
FIG. 12 is a schematic cross-sectional view of a third embodiment of a cushion for use within the restraint system after providing third and fourth sets of folds in different manners.

FIG. 12 shows yet another embodiment of the present invention. Specifically, FIG. 12 shows third and fourth sets of folds 256, 260 provided in a cushion 220 through two different types of combined accordion and roll folding. Following formation of the third and fourth sets of folds 256, 260, the cushion 220 is lifted away from a contact face 238, preferably at a mounting ring 230, preferably at a contact face 238, to reveal a first portion 264 and a third portion 266 of an outer surface 252 of the cushion 220. A second portion 265 of the outer surface 252 interconnects the first and third portions 264, 266. The third and fourth sets of folds 256, 260 are then tucked between the first and third portions 264, 266 and the contact face 238 to at least partially define a substantially unobstructed fluid path 272 between an inflator 228 and the contact face 238. Tucking the third and fourth sets of folds 256, 260 between the first and third portions 265, 266, respectively, and the contact face 238 creates first and second pockets 268, 270, with the third and fourth sets of folds 256, 260 resting within the respective first and second pockets 268, 270.

Each embodiment of the present invention provides a supplemental inflatable restraint system including a cushion having a contact face, and folds created such that the cushion fits within a support member. Preferably, the folds include first, second, third and fourths sets of folds, with the first and second sets of folds of each embodiment being interchangeable, and with the third and fourth sets of folds of each embodiment being interchangeable. The folds at least partially define a substantially unobstructed fluid path, and are tucked between the contact face and a fluid-emitting inflator. Upon actuation of the inflator, fluid emitted by the inflator travels through the fluid path to inflate the cushion outward, such that the cushion is presented as a single layer at the contact face throughout inflation of the cushion. The folds may be provided in any manner known in the art, including pleat folding, accordion folding and roll folding, within the scope of the present invention. Additionally, each set of folds can be formed using a different folding technique without changing the present invention.

The present invention also provides a method of folding an inflatable cushion 20 for use in a supplemental inflatable restraint system. Describing the method with respect to the first embodiment of the supplemental restraint system 22 (FIGS. 1-7), a preferably substantially flat inflatable cushion 20 is provided, with the cushion 20 having a contact face 38 and an outer surface 52. A fluid-emitting inflator 28 selectively actuatable to inflate the cushion 20 is provided. The cushion 20 is folded as described above. The inflator 28 is installed at the cushion 20, preferably after cushion folding, in fluid communication therewith. The folded cushion 20 defines a substantially unobstructed fluid path 72 between the inflator 28 and the contact face 38, thereby allowing the cushion 20 to be presented as a single layer at the contact face 38 upon actuation of the inflator 28. The folding step preferably comprises folding the cushion 20 inward from a first direction 42 to create a first set of folds 40, folding the cushion 20 inward from a second direction 48 preferably substantially opposing the first direction 42 to create a second set of folds 46, folding the cushion 20 inward from a third direction 58 offset from and preferably substantially perpendicular to the first and second directions 42, 48 to create a third set of folds 56, and finally folding the cushion 20 inward from a fourth direction 62 substantially opposing the third direction 58 to create a fourth set of folds 60.

The method may further include the step of folding a first portion 64 of the outer surface 52 such that the first portion 64 is disposed directly adjacent a second portion 65 of the outer surface, as shown in FIG. 7. The second portion 65 is the portion of the cushion outer surface 52 connecting first and third portions 64, 66 thereof. As shown in FIG. 7, the second portion 65 may be directly opposite the cushion 20 from the contact face 38. However, the second portion may also be a portion of the contact face, as shown in the second embodiment of the present invention (see FIG. 11). One of the third and fourth sets of folds 56, 60 is then tucked in between the first portion 64 and one of the inflator 28 (that is, the position the inflator 28 will be in after inflator installation), and the contact face 38. The method may also include the step of folding a third portion 66 of the outer surface 52 such that the third portion 66 is disposed directly adjacent the second portion 65 of the outer surface 52, as also shown in FIG. 7. The other of the third and fourth sets of folds 56, 60 is then tucked in between the third portion 66 and one of the inflator 28 and the contact face 38. FIG. 7 shows the third and fourth sets of folds 56, 60 tucked between the first and third portions 64, 66 and the contact face 38, while FIG. 11 shows the third and fourth sets of folds 156, 160 tucked between the first and third portions 164, 166 and the inflator 128.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. For example, while FIGS. 3a-3c show formation of first and second sets of folds 40, 46 through pleat folding, wherein two pleats have been provided, any number of pleats may be provided without changing the inventive concept. Also, as set forth in the claims, different features from different embodiments may be combined within the scope of the present invention. It is, therefore, to be understood that within the scope of the appended claims, the invention may be practiced in a substantially equivalent way other than as specifically described herein.

The invention claimed is:

1. A supplemental inflatable restraint system comprising:
an inflatable cushion having a contact face, said cushion having folds provided therein, said folds comprising first, second, third and fourth sets of folds created by folding said cushion inwardly from first, second, third and fourth directions, respectively; and
an inflation fluid dispensing member selectively actuatable for inflating said cushion, said folds at least partially defining a substantially unobstructed fluid path extending between said inflation fluid dispensing member and a rearward most portion of said contact face following attachment to a support member such that said inflatable cushion is ready for installation within a vehicle;
wherein at least some of said folds are tucked between said contact face and said inflation fluid dispensing member such that upon actuation of said inflation fluid dispensing member, fluid emitted therefrom travels through said fluid path to inflate said cushion outwardly such that said cushion is presented as a single layer at said contact face during inflation of said cushion, said at least some of said folds tucked between said contact face and said inflation fluid dispensing member comprising at least one of said third and fourth sets of folds.

2. The supplemental inflatable restraint system of claim 1, wherein said cushion includes an outer surface, and wherein a first portion of said outer surface is disposed directly adjacent a second portion of said outer surface, and wherein said at least one of said third and fourth sets of folds is tucked between said first portion of said outer surface and one of said inflation fluid dispensing member and said contact face.

3. The supplemental inflatable restraint system of claim 2, wherein a third portion of said outer surface is disposed directly adjacent said second portion of said outer surface, such that the other of said third and fourth sets of folds is tucked between said third portion and one of said inflation fluid dispensing member and said contact face.

4. The supplemental inflatable restraint system of claim 1, wherein at least one of said sets of folds is provided by one of pleat folding and roll folding.

5. The supplemental inflatable restraint system of claim 1, wherein at least one of said third and fourth sets of folds is provided by at least one of accordion folding, pleat folding and roll folding.

6. The supplemental inflatable restraint system of claim 1, wherein said second direction substantially opposes said first direction, and said fourth direction substantially opposes said third direction, with said third and fourth directions being substantially perpendicular to said first and second directions.

7. The supplemental inflatable restraint system of claim 1, further comprising:
a cover engaging said support member to define a cavity for housing said cushion.

8. The supplemental inflatable restraint system of claim 7, wherein said cover is one of a driver air bag cover on a vehicle steering wheel and at least a portion of interior vehicle structure.

9. The supplemental inflatable restraint system of claim 1, wherein said inflation fluid dispensing member includes at least one of a nozzle extending upwardly into said fluid path between said folds and openings about a circumferential perimeter thereof for directing inflation fluid to said fluid path.

10. A supplemental inflatable restraint system comprising:
an inflatable cushion including:
a contact face;
a first set of folds created by folding said cushion inwardly from a first direction;
a second set of folds created by folding said cushion inwardly from a second direction;
a third set of folds created by folding said cushion inwardly from a third direction; and
a fourth set of folds created by folding said cushion inwardly from a fourth direction; and
an inflation fluid dispensing member selectively actuatable for inflating said cushion, with substantially all of said folds being tucked between said contact face and said inflation fluid dispensing member;
said first, second, third and fourth sets of folds at least partially defining a substantially unobstructed fluid path between said inflation fluid dispensing member and said contact face such that upon actuation of said inflation fluid dispensing member, fluid emitted therefrom travels through said fluid path to inflate said cushion outwardly such that said cushion is presented as a single layer at said contact face during inflation of said cushion.

11. The supplemental inflatable restraint system of claim 10, wherein at least one of said first and second sets of folds is created by pleat folding and one accordion fold.

12. The supplemental inflatable restraint system of claim 10, further comprising:
a mounting ring positioned inside of and extending through said cushion, said mounting ring having an opening for receiving said inflation fluid dispensing member.

13. A method of folding an inflatable cushion for use in a supplemental inflatable restraint system comprising:
providing an inflatable cushion having a contact face and an outer surface;
providing an inflation fluid dispensing member selectively actuatable to inflate said cushion;
folding said cushion to create folds, including:
folding said cushion inwardly from a first direction to create a first set of folds;
folding said cushion inwardly from a second direction to create a second set of folds;
folding said cushion inwardly from a third direction to create a third set of folds;
folding said cushion inwardly from a fourth direction to create a fourth set of folds, said first, second, third and fourth sets of folds comprising at least some of said folds; and tucking substantially all of said folds into said cushion between said inflation fluid dispensing member and said contact face, including: folding a first portion of said outer surface of said cushion such that said first portion is disposed directly adjacent a second portion of said outer surface;

tucking one of said third and fourth sets of folds between said first portion and one of said inflation fluid dispensing member and said contact face; and installing said inflation fluid dispensing member such that said cushion defines a substantially unobstructed fluid path between said inflation fluid dispensing member and said contact face following attachment to a support member such that said inflatable cushion is ready for installation within a vehicle, thereby allowing said cushion to be presented as a single layer at said contact face during inflation of said cushion, said first, second, third and fourth sets of folds at least partially defining said fluid path.

14. The method of folding an inflatable cushion of claim 13, wherein said tucking step further comprises:

folding a third portion of said outer surface of said cushion such that said third portion is disposed directly adjacent said second portion of said outer surface; and tucking the other of said third and fourth sets of folds between said third portion and one of said inflation fluid dispensing member and said contact face.

15. The method of folding an inflatable cushion of claim 13, wherein said tucking step further comprises:

lifting said cushion away from said inflation fluid dispensing member at said contact face; and tucking said folds between said contact face and said inflation fluid dispensing member.

16. The method of folding an inflatable cushion of claim 13, wherein said tucking step further comprises:

installing a mounting ring through said cushion;

lifting said cushion away from said inflation fluid dispensing member at said mounting ring; and tucking said folds between said contact face and said inflation fluid dispensing member.

17. The method of folding an inflatable cushion of claim 13, wherein said third and fourth sets of folds are created by at least one of accordion folding, pleat folding and roll folding.

* * * * *